United States Patent Office 3,070,158
Patented Dec. 25, 1962

3,070,158
SECONDARY RECOVERY USING A WATER FLOODING TECHNIQUE
Robert Roper, Roselle, and Paul L. Stright, Union, N.J., assignors to Jersey Production Research Company, a corporation of Delaware
No Drawing. Filed Jan. 20, 1959, Ser. No. 787,807
7 Claims. (Cl. 166—9)

The present invention is concerned with a secondary recovery operation for obtaining oil from subterranean reservoirs. The invention is more particularly directed to a secondary recovery procedure wherein a fluid such as water is employed as a driving medium. The invention is especially concerned with an improved type viscous water flooding process in which fingering and oil reservoir bypassing on the part of the fluid is substantially reduced by the utilization of a particular class of water thickening agents. These agents are selected from the class of amine adducts of copolymers of ethylenically unsaturated compounds and maleic anhydride. Preferred agents are amine adducts of vinyl aromatic-maleic anhydride copolymers.

Specifically, copolymers of vinyl compounds such as styrene or ethylene and maleic anhydride are reacted with amines such as methylamine to produce polymers containing amide side chains. These materials produce high viscosities in aqueous solution and have high thermal stability and are therefore advantageously used as water thickeners in water flooding of oil reservoirs.

Although there have been substantial advances in "primary recovery" techniques for the recovery of oil, nevertheless a substantial portion of the oil remains in the reservoir after termination of the primary recovery methods. Generally, it is estimated that only about 30 to 50% of the oil can be economically recovered by primary recovery technique. A greater amount may be recovered by other secondary techniques, such as re-pressuring treatments following the primary method.

Thus, there exists a great interest in "secondary recovery" methods. Secondary recovery is the augmentation of remaining reservoir energy after depletion by primary recovery methods. The reservoir energy is augmented by drilling one or more injection wells into a permeable oil bearing formation within suitable proximity to a producing well or wells which are drilled into this same permeable oil bearing formation. Injection of liquids or gases through the injection well is generally effective in increasing the oil production from the producing well or wells. This technique of secondary recovery enables the recovery of substantially more oil than can be produced by primary recovery methods.

As pointed out, the use of secondary recovery procedures for removing oil from subterranean oil reservoirs is well known in the petroleum industry. It is the function of such procedures to make possible the recovery of oil from reservoirs after primary production methods are uneconomical. In general, all secondary recovery procedures employ a driving medium such as a liquid or gas for displacing additional oil from a reservoir. The displacing medium, usually a fluid, is injected in a reservoir as by means of one or more of the original wells or by means of entirely new wells; and the oil in the reservoir is displaced toward and withdrawn from other remaining wells.

Due partially to its ready availability in many regions, water has been extensively employed as a driving medium in secondary oil recovery programs. This medium, however, has been found to possess several serious shortcomings. One particularly noteworthy shortcoming lies in the fact that a water drive frequently "fingers" and tends to bypass substantial portions of an oil reservoir.

It is known that oil reservoirs possess regions and strata of different permeabilities; and apparently the water flows much more rapidly through some reservoir flow paths than it does through others. The net result of this occurrence is that water flooding often completely misses substantial portions of a reservoir.

It is well to note that oil reservoir fluids and crude oils vary greatly in viscosity—some being as low as 1 or 2 cps. and some ranging up to 1000 cps. or even more. It is also well known that water flooding as well as other secondary recovery procedures perform less satisfactorily with high viscosity crude oils and reservoir fluids than with relatively low viscosity crude oils and reservoir fluids.

Accordingly, several procedures have been suggested to date for improving the mechanics of water flooding procedures, particularly with a view to reducing the degree of fingering and bypassing. One suggestion has been to increase the viscosity of the water drive relative to the oil (i.e., the water/oil viscosity ratio) by incorporating water soluble thickening agents within the water. Materials that have been suggested for this purpose include a wide variety of naturally occurring gums and polymers. These materials, however, have been observed to be somewhat unstable and to decrease in effectiveness due to loss in viscosity. Also, many of them clog the pores of oil reservoirs and consequently tend to greatly increase the resistance to flow of fluids within these reservoirs and to thereby hamper a flooding program.

It has also been suggested to employ aqueous solutions of certain synthetic polymers such as the copolymers of methyl vinyl ether and maleic anhydride, polyacrylic acid, sodium polymethacrylate, acrylamide-acrylic acid copolymer, polyvinylpyridine, etc. All of these solutions are characterized by viscosities that are greater than that of water and accordingly would be more attractive than water as flooding media. With regard to these types of aqueous solutions, however, it has been observed that their viscosities are greatly decreased when they are aged at elevated temperatures such as those normally encountered in oil reservoirs.

In accordance with the specific adaptation of the present invention, an improved class of water thickening agents is utilized consisting of the amine adducts of copolymers of ethylenically unsaturated compounds and maleic anhydride, as pointed out heretofore. These materials show a marked improvement in thermal stability over unmodified copolymers of maleic anhydride, due to the presence of the half amide group

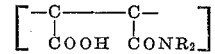

instead of the dicarboxylic group

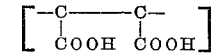

present in the unmodified hydrolysis product of maleic anhydride copolymers.

The copolymers of ethylenically unsaturated compounds and maleic anhydride are produced by copolymerizing vinyl compounds such as styrene, vinyl toluene, vinyl naphthalene and the like with maleic anhydride. These materials are obtained in high molecular weights by using azobisisobutyronitrile as catalyst, and polymerizing at low temperatures, such as 30°–60° C. Other catalysts can be used, such as benzoyl peroxide and cumene hydroperoxide. Specific ethylenically unsaturated compounds exemplifying monomers that may be copolymerized with maleic anhydride are as follows: styrene, vinyl toluene, α-methyl styrene, p-chlorostyrene, vinylnaphthalene, ethylene, propylene, isobutylene, ethyl acrylate and methyl methacrylate.

The compounds of the present invention are prepared by copolymerizing an ethylenically unsaturated compound with maleic anhydride and then reacting the copolymer with an amine to convert the anhydride groups to half amide-half acid groups. Satisfactory amines are those having from about 1 to 5 carbon atoms. Particularly desirable amines are methyl amine, ethyl amine, n-propyl amine, isopropyl amine, dimethyl amine, diethyl amine. Mixtures of these amines may be used.

The invention may be more fully understood by the following example illustrating the same. The refluxing in all cases was carried out at 100° C. This temperature represents the more extreme reservoir conditions. A similar type of behavior may be expected at lower, more common reservoir temperatures, that is, 60° C., but over longer periods of time. Therefore, aging tests which will run at 100° C. for several days are a realistic reflection of stability at 60° C., since polymer solutions will remain at these temperatures for long periods of time as, for example, up to 10 years. It should be noted that the specific advantage of the compounds of the present invention lies in its application to high temperature reservoirs in the range from about 40° to 100° C. Furthermore, extensive hydrolysis of the amine adduct does not occur under reservoir conditions.

Example 1

Styrene and maleic anhydride were copolymerized by heating these compounds in a ratio of 34.7 g. of styrene to 32.7 g. of anhydride at 45° C. The solvent employed was about 200 ml. methyl ethyl ketone. Azobisisobutyronitrile was used as an initiator. The polymer was then precipitated from methyl ethyl ketone by the addition of 200 ml. of methanol. This polymer was then shaken at room temperature for 18 hours with a 25% aqueous solution of dimethylamine. The product was precipitated by acidification with aqueous HCl and addition of methanol, washed with water, dried and dissolved in a synthetic salt water mixture.[1]

The thermal stability of this solution was compared with that of a similar solution containing an unmodified hydrolyzed sample of styrene-maleic anhydride copolymer and results are given in the following table.

| Compound | Conc., wt. Percent | Initial viscosity[a] | Percent viscosity retained | |
|---|---|---|---|---|
| | | | After 24 hr. reflux | 143 hr. reflux |
| Styrene-maleic anhydride copolymer, hydrolyzed form | 0.5 | 7.2 | 49 | 31 |
| Dimethyl amine adduct of styrene-maleic anhydride copolymer[b] | 0.5 | 6.7 | 101 | 69 |

[a] Brookfield viscosity, cp. @ 60° C., 30 r.p.m., U. L. adapter.
[b] Both compounds prepared from same styrene-maleic anhydride copolymer sample.

After 24 hours reflux aging, the amine adduct showed no loss in viscosity, while the unmodified polymer degraded considerably. The improvement in thermal stability of the amine adduct persists after 143 hours of reflux aging.

In addition to their superior thermal stability, the amine adducts retain the advantageous characteristics of styrene-maleic anhydride copolymers with respect to water thickening in secondary recovery: (1) high viscosity in electrolytic solutions at low concentrations (2) low plugging tendency in reservoir formations (3) stability of viscosity over broad pH region.

The amine adducts of these copolymers fulfill the following requirements:
(1) High viscosities in electrolytic solutions at low concentrations of polymer.

[1] Mixture contains 40 liters of water, 2.72 grams sodium bicarbonat 4.28 grams sodium sulfate, 5.52 grams magnesium chloride, 3.56 gram, calcium chloride, 36.5 grams sodium chloride and 2.05 grams aluminum odium sulfate—$(Al_2(SO_4)_3Na_2SO_4.24 H_2O)$.

(2) Stability of aqueous solutions at elevated temperatures for extended periods of time.
(3) Low plugging tendency in reservoir formations.
(4) Stability of viscosity over a broad pH region.

The molecular weights of the polymers of the present invention should be in excess of about 100,000. In general, preferred polymers should be above about 500,000, preferably, above 1,000,000. The molecular weights may be as high as 3,000,000 to 5,000,000, or up to 10,000,000 and higher. When a polymer has a molecular weight in the range from 500,000 to 1,000,000, it should be used in the concentration of less than about 1% by weight, preferably, in the range from 0.1 to 0.5% by weight.

The required viscosity of the viscous water solution depends on a number of characteristics of the system in which it is applied:

A. Viscosity of crude to be displaced
B. Wetting characteristics of the reservoir
C. Relative permeability to oil and water To obtain an advantage with viscous water, the viscosity does not have to equal the viscosity of the crude oil, but should be high enough to give a favorable mobility ratio.[2] For example, a particular reservoir which is water wet and contains a crude with 40 cp. average viscosity at reservoir temperature, would require a 12–15 cp. solution of thickener for efficient flooding.

Stability of viscous solutions may be defined as follows:
Heat aging—the exposure of the material to elevated temperatures for certain periods of time; for example, refluxing under a blanket of nitrogen for a specified period of time. The percent viscosity retention may be taken as a measure of stability to heat aging.

What is claimed is:

1. In a method of recovery of oil from oil bearing formations, the step of flooding an oil bearing formation with water containing as a viscosity improving agent up to about one percent of an amine adduct of a copolymer of maleic anhydride and an ethylenically unsaturated compound copolymerizable therewith, said copolymer having a molecular weight in excess of about 100,000.

2. In a method of recovery of oil from oil bearing formations, the step of flooding the oil bearing formation with water containing as a viscosity improving agent up to about one percent by weight of an amine adduct of a copolymer of an ethylenically unsaturated compound and maleic anhydride, said adduct having a structure as follows:

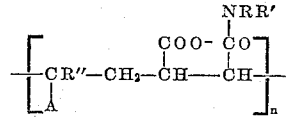

wherein
R is selected from the group consisting of H and alkyl,
R' is an alkyl radical,
R'' is selected from the group consisting of H and $CH_3$,
A is selected from the group consisting of H, alkyl, aryl, haloaryl, alkylaryl, aralkyl and carboxylic ester radicals, and wherein $n$ is of a magnitude to give a molecular weight in the range from 500,000 to 5,000,000.

3. In a method of recovery of oil from oil bearing formations, the step of flooding the oil bearing formation with water containing as a viscosity improving agent up to about one percent by weight of an amine adduct of a copolymer of maleic anhydride and an ethylenically

[2] Mobility ratio is defined as follows:

$$M.R. = \frac{K_w V_o}{V_w K_o}$$

where K is permeability, V is viscosity, and subscripts $w$ and $o$ denote water and oil respectively. If M.R. is less than one, it is favorable.

unsaturated compound copolymerizable therewith, said adduct having a structure as follows:

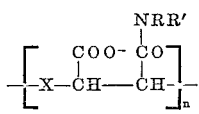

wherein
R is selected from the group consisting of H and alkyl,
R' is an alkyl radical,
X is the unit of structure of said ethylenically unsaturated compound, and wherein $n$ is of a magnitude to give a molecular weight in excess of about 100,000.

4. In a secondary recovery operation for the production of oil from a subterranean reservoir wherein water is used as a driving medium, the improvement of which comprises the step of flooding the oil bearing formation with water containing from about 0.5% by weight of an amine adduct of a copolymer of maleic anhydride and styrene, said copolymer having a structure as follows:

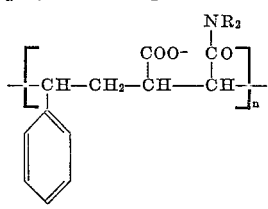

wherein $n$ is of a magnitude to give a molecular weight in the range from 500,000 to 5,000,000, said copolymer being made by using as a catalyst azobisisobutyronitrile at a temperature in the range from about 30° to 60° C.

5. In a method of recovery of oil from oil bearing formations, the step of flooding the oil bearing formation with water containing as a viscosity improving agent from about 0.5% by weight of an amine adduct of a copolymer of an ethylenically unsaturated compound and maleic anhydride, said copolymer having a structure as follows:

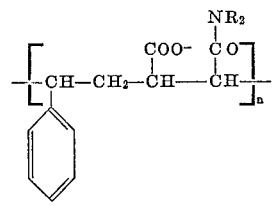

wherein $n$ is of a magnitude to give a molecular weight in the range from 500,000 to 5,000,000.

6. Process as defined by claim 5 wherein said amine adduct is secured by reacting said copolymer with an amine containing from about 1 to 5 carbon atoms.

7. Process as defined by claim 5 wherein said amine is dimethylamine.

References Cited in the file of this patent
UNITED STATES PATENTS

| | | |
|---|---|---|
| 2,718,497 | Oldham et al. | Sept. 20, 1955 |
| 2,771,138 | Beeson | Nov. 20, 1956 |
| 2,827,964 | Sandiford et al. | Mar. 25, 1958 |
| 2,842,492 | Engelhardt et al. | July 8, 1958 |